(12) United States Patent
Bilder

(10) Patent No.: US 6,400,804 B1
(45) Date of Patent: Jun. 4, 2002

(54) ON-HOLD ACTIVITY SELECTION APPARATUS AND METHOD

(75) Inventor: Mitchell K. Bilder, Manalapan, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/209,201

(22) Filed: Dec. 10, 1998

(51) Int. Cl.$^7$ .................. H04M 1/64; H04M 11/00; H04M 3/42; H04M 3/00

(52) U.S. Cl. ................. 379/76; 379/88.13; 379/114.13; 379/142.15; 379/207.06; 379/211.02; 379/212.01; 379/265.09; 379/393; 379/908

(58) Field of Search ................... 379/34, 67.1, 88.11, 379/88.12, 88.13, 88.17, 88.22, 88.23, 88.25, 93.21, 100.12, 102.03, 112, 120, 157, 158, 201, 202, 205, 208, 209–212, 243, 262, 268, 374, 393, 900, 908, 917, 72, 76, 93.12, 114.11, 114.12, 114.13, 201.1, 202.1, 202.01, 207.06, 207.07, 211.02, 212.01

(56) References Cited

U.S. PATENT DOCUMENTS

| | | | | |
|---|---|---|---|---|
| 5,530,852 A | * | 6/1996 | Meske, Jr. et al. | 395/600 |
| 5,557,658 A | * | 9/1996 | Gregorek et al. | 379/67.1 |
| 5,572,643 A | * | 11/1996 | Judson | 395/793 |
| 5,687,331 A | * | 11/1997 | Volk et al. | 395/327 |
| 5,721,827 A | * | 2/1998 | Logan et al. | 395/200.47 |
| 5,850,433 A | * | 12/1998 | Rondeau | 379/201 |
| 5,875,231 A | * | 2/1999 | Farfan et al. | 379/67.1 |
| 6,006,265 A | * | 12/1999 | Rangan et al. | 709/226 |
| 6,020,916 A | * | 2/2000 | Gerszberg et al. | 348/15 |
| 6,031,836 A | * | 2/2000 | Haserodt | 370/389 |
| 6,112,181 A | * | 8/2000 | Shear et al. | 705/1 |
| 6,122,346 A | * | 9/2000 | Grossman | 379/68 |

* cited by examiner

Primary Examiner—Allan Hoosain
(74) Attorney, Agent, or Firm—Oliff & Berridge, PLC (57) ABSTRACT

An on-hold activity selection apparatus and method that allows an on-hold party to select an on-hold activity, from a menu of on-hold activities, with which to be entertained and/or informed. The on-hold activity selection apparatus detects the occurrence of an on-hold condition in a communication between a first party terminal and a second party terminal. In response to detecting the on-hold condition, the on-hold activity selection apparatus provides a menu of available on-hold activities to the terminal which is placed on-hold. If a reply is received from the on-hold terminal identifying a selected on-hold activity, the on-hold activity selection apparatus then provides the on-hold terminal with the selected activity. The menu of available on-hold activities may be based on profile information, corresponding to the on-hold terminal, stored in a database. The on-hold activities may include listening to music, advertisements, sports, news, viewing television broadcasts, graphical presentations, prerecorded video messages, reading textual messages, playing video games, browsing the Internet, and the like. The on-hold activities may include live feeds and/or prerecorded activities.

4 Claims, 6 Drawing Sheets

| CODE | ON-HOLD ACTIVITY |
|---|---|
| 00 | LISTEN TO SILENCE |
| 01 | LISTEN TO MUSIC |
| 02 | VIEW NEWS BROADCAST |
| 03 | LISTEN TO SPORTS |
| 04 | LISTEN TO PROMOTIONAL |

ON-HOLD ACTIVITY SELECTION APPARATUS AND METHOD

BACKGROUND OF THE INVENTION

1. Field of Invention

This invention relates to an on-hold activity selection device and method that enables a party using a communications system to choose one of a plurality of on-hold activities while being in an on-hold condition on the communications system.

2. Description of Related Art

Conventional communications systems, such as conventional telephone systems, provide convenient on-hold features where a first party may place a second party on-hold while the first party performs other tasks such as searching for or developing information requested by the second party. Also, automatic answering devices are used by businesses (mail order houses, for example) that often place a calling party on-hold until an operator becomes available to interact with the calling party. Thus, calling parties are forced to wait for a period of time for an operator to become available. The wait time may cause the calling parties inconvenience which may result in the calling party abandoning their call. Accordingly, new technology is required to alleviate the wait time inconvenience of calling parties.

SUMMARY OF THE INVENTION

The invention provides an on-hold activity selection device and method that permits a party placed on hold to select from a repertoire of activities that may include listening to music, news, sports, playing video games or other entertaining and/or informative activities while being placed on-hold. When the on-hold condition is detected, the on-hold activity selection device provides the on-hold party with a menu from which the on-hold party may choose one of a plurality of entertaining and/or informative activities in which to be involved during an on-hold period. While the call is placed on-hold, the on-hold activity selection device monitors the communication link between the communicating parties to determine whether the on-hold condition is removed. When the on-hold condition is removed, the on-hold activity selection device may pause the activities so that the communicating parties may continue the communication. Information indicating the current status of the on-hold activity (such as a place holder, if appropriate) may be stored in memory so that the on-hold activity may be resumed at a later time (e.g., when placed on-hold again) without repeating itself.

BRIEF DESCRIPTION OF THE DRAWINGS

The invention is described in detail with regard to the following figures, wherein like numerals reference like elements, and wherein.

DETAILED DESCRIPTION OF THE PREFERRED EMBODIMENTS

Figure 1:
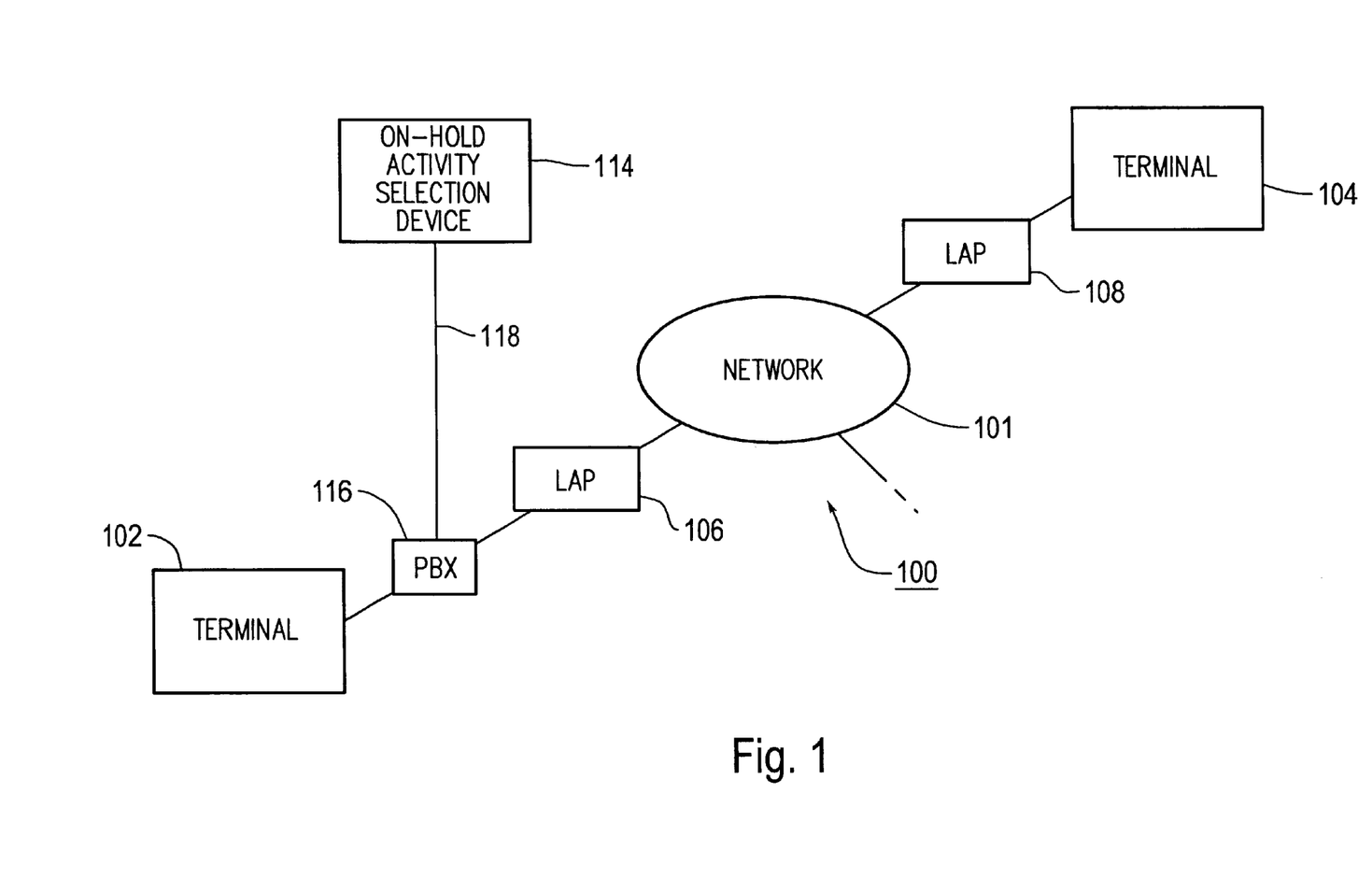
FIG. 1 is an exemplary block diagram of an on-hold activity selection system.

FIG. 1 is an exemplary block diagram of a system 100 according to the present invention. As shown in FIG. 1, the system includes terminals 102 and 104 coupled to a network 101 through communication links and local access providers (LAPs) 106 and 108, respectively. The terminal 102 may be coupled to the LAP 106 through a private branch exchange (PBX) 116, for example. An on-hold activity selection device 114 may be coupled to the PBX 116 by way of a communications link 118.

The terminals 102 and 104 may be devices of any type that allows for the transmission and/or reception of communication signals. For example, the terminals 102 and 104 may be land-line telephones, cellular telephones, computers, personal digital assistants, video telephones, video conference apparatuses, smart or computer assisted televisions, and the like. For purposes of the following description of the present invention, it will be assumed that the terminals 102 and 104 are telephones.

The terminals 102 and 104 are in communication with the network 101 through LAPs 106 and 108 over communications links. These communications links may be any type of connection that allows the transmission of information. Some examples include conventional telephone lines, fiber optic lines, direct serial connection, cellular telephone connections, satellite communication links, local area networks (LANs), intranets, and the like.

The terminals 102 and 104 send communication signals to one another over the communications links and through LAPs 106 and 108. The LAPs 106 and 108 are devices that provide interfaces to the network 101. The LAPs 106 and 108 may include Local Exchange Carriers (LECs), Internet Access Providers (IAPs), satellite base stations, cellular communication base stations, and the like.

The communication signals are received by the network 101 and are routed in the network 101, by way of, for example, routers and switches (not shown) to a destination terminal. The routing may be performed by switches such as Lucent Technologies Inc. 5ESS and 4ESS switches, for example, which are generally known in the art.

The network 101 may be a single network or a plurality of networks of the same or different types. For example, the network 101 may include a local telephone network (such as a Bell Atlantic telephone network) in connection with a long distance network (such as an AT&T long distance telephone network). Further, the network 101 may be a data network or a telecommunications network in connection with a data network. Any combination of telecommunications and data networks may be used without departing from the spirit and scope of the present invention. For purposes of discussion, it will be assumed that the network 101 is a single telecommunications network.

An on-hold activity selection device 114 is coupled to the PBX 116 via the communication link 118. While FIG. 1 shows the on-hold activity selection device 114 coupled to the PBX 116, the PBX 116 is not necessary to the functioning of the present invention. For example, the on-hold activity selection device 114 may be directly linked to both the terminal 102 and the LAP 106. Thus, all communication signals being passed between the terminal 102 and the LAP 106 would be routed through the on-hold activity selection device 114. For the purposes of the following description, the use of the PBX 116 as shown in FIG. 1 is assumed.

The on-hold activity selection device 114 provides activity services to parties that are placed on-hold. For purposes of the following description, it will be assumed that the terminal 102 places the terminal 104 on-hold. However, either one of the terminals 102 or 104 may place the other terminal on-hold.

The on-hold activity selection device 114 may be an independent unit coupled to the PBX 116 (as shown), may be incorporated in the terminal 104, or may be distributed throughout the communications network 101. Additionally, the on-hold activity selection device 114 may be an independent device coupled directly to the communications network 101. Any configuration that permits on-hold activities to be selected and supplied to an on-hold party may be used without departing from the spirit and scope of the present invention.

When a calling party uses the terminal 104, for example, to communicate with the terminal 102, the communication signals are routed via the communications network 101 to terminal 102. In a first embodiment of the present invention, the communication signals between the terminals 102 and 104 are routed through the on-hold activity selection device 114. The on-hold activity selection device 114 may be alerted to an on-hold condition by detecting a signal generated by either of the terminals 102 or 104, for example. The on-hold activity selection device 114 may also detect the on-hold condition by monitoring the communication link between the terminals 102 and 104 for an idle condition, such as a period of time of silence, for example.

In a second embodiment, the communication signals are routed directly to the terminal 102 through the PBX 116. If the terminal 102 places the communication with the terminal 104 on-hold, the terminal 102 may send a signal to the PBX 116 instructing the PBX 116 to connect the on-hold activity selection device 114 to the terminal 104. In this way, the on-hold activity selection device 114 may communicate with the terminal 104 while the terminal 104 is on-hold with respect to the terminal 102.

When the terminal 104 is placed on-hold in either one of the first or second embodiments, the on-hold activity selection device 114 provides the terminal 104 with a menu of one or more activities from which the on-hold party may select. Once a selection is obtained from the terminal 104, the on-hold activity selection device 114 provides the terminal 104 with the selected activity.

While the terminal 104 is in the on-hold condition with respect to the terminal 102, the on-hold activity selection device 114 monitors for a signal from the terminal 102 indicating that the on-hold condition has been removed and communication between terminals 102 and 104 is available. When the on-hold condition is removed, the on-hold activity selection device 114 reestablishes the communication connection from terminal 104 to terminal 102. The chosen activity is temporarily paused and information pertaining to the current activity status and the terminal 104 is stored in memory so that the activity may be resumed at a later time. If the terminal 104 is not placed on-hold again or does not send communication signals to the on-hold activity selection device 114 within a predetermined period of time, the activity status is deleted from memory. Alternatively, the activities may be terminated when the on-hold condition is removed.

When the terminal 104 is placed on-hold, the on-hold activity selection device 114 sends a menu message to the terminal 104 that provides a listing of available on-hold activities that may be provided to the first party for his/her entertainment and/or information. Once the menu message is sent to the terminal 104, the on-hold message device monitors for a reply message from terminal 104 identifying the on-hold party's selection from the available on-hold activities. If a reply message is not received within a predetermined period of time, the menu message may be sent to the terminal 104 again or a silence condition, i.e., no activities being provided, may be maintained.

If a reply message is received, the on-hold activity selection device 114 provides the on-hold activity associated with the selected activity to the terminal 104. If the on-hold activity is completed before termination of the on-hold condition, the on-hold activity may be repeated or the menu message may be sent to the terminal 104 prompting him/her to select a new on-hold activity from the listing of available on-hold activities.

Additionally, if the on-hold party wishes to switch on-hold activities in the middle of a selected on-hold activity, an appropriate code or command may be entered through terminal 104 to cause on-hold activity selection device 114 to again send the menu message to the terminal 104. For example, the terminal 104 may transmit a code "*8" from a telephone keypad to on-hold activity selection device 114 to stop the current on-hold activity and cause the menu message to be sent to terminal 104.

The on-hold activities provided to the on-hold party's terminal may be audio, visual, textual or any combination of audio, visual and textual based activities. For example, if the terminal 104 is capable of receiving video and audio transmissions, the on-hold activity may include viewing a video transmission and/or listening to an audio transmission. The on-hold activities may include, for example, listening to music, listening, viewing or reading advertisements, news, sports, graphical presentations, prerecorded video messages, playing video games, browsing the Internet, reading textual messages, and any other type of entertaining and/or informative activity. The activities may be provided from recorded information or or may be live feeds from, for example, radio stations, television stations, and the like.

Figure 2:
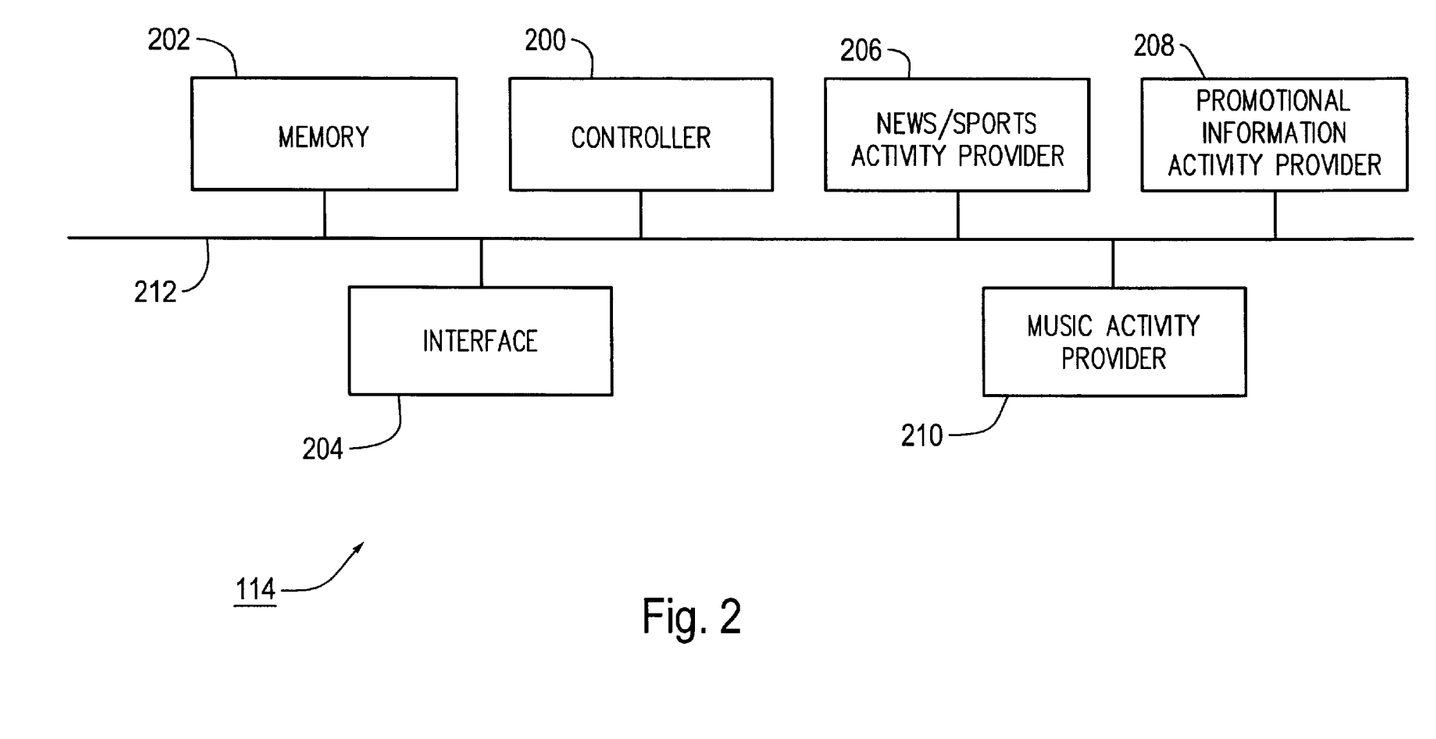
FIG. 2 is an exemplary block diagram of the on-hold activity selection device of FIG. 1.

FIG. 2 is an exemplary block diagram of the on-hold activity selection device 114. The on-hold activity selection device 114 includes a controller 200, a memory 202, an interface 204, a news/sports activity provider 206, a promotional information activity provider 208 and a music activity provider 210. The above components are coupled together through a control/signal bus 212. The above providers 206–210 are only exemplary and any other type provider may also be incorporated into the on-hold activity selection device 114. For example, a religious activity provider, a talk show activity provider, and the like, may be incorporated into the on-hold activity selection device 114.

When a communication from a terminal 104, for example, is placed on-hold, the on-hold condition is detected by the controller 200. The controller 200, in response to the detection of an on-hold condition, sends a menu message to the terminal 104, now the on-hold party's terminal 104, through the interface 204, prompting the on-hold party to select an on-hold activity from a list of available on-hold activities.

The controller 200 monitors for a reply message, via the interface 204, from the on-hold party's terminal 104 indicating the on-hold party's selection. Upon receiving a reply message selecting one of the available on-hold activities, the controller 200 instructs one of the news/sports activity provider 206, the promotional information activity provider 208 or music activity provider 210, to provide the selected activity to terminal 104 through the interface 204, for example.

The listing of the plurality of on-hold activities, along with the control programs, may be stored in memory 202.

Figure 3:
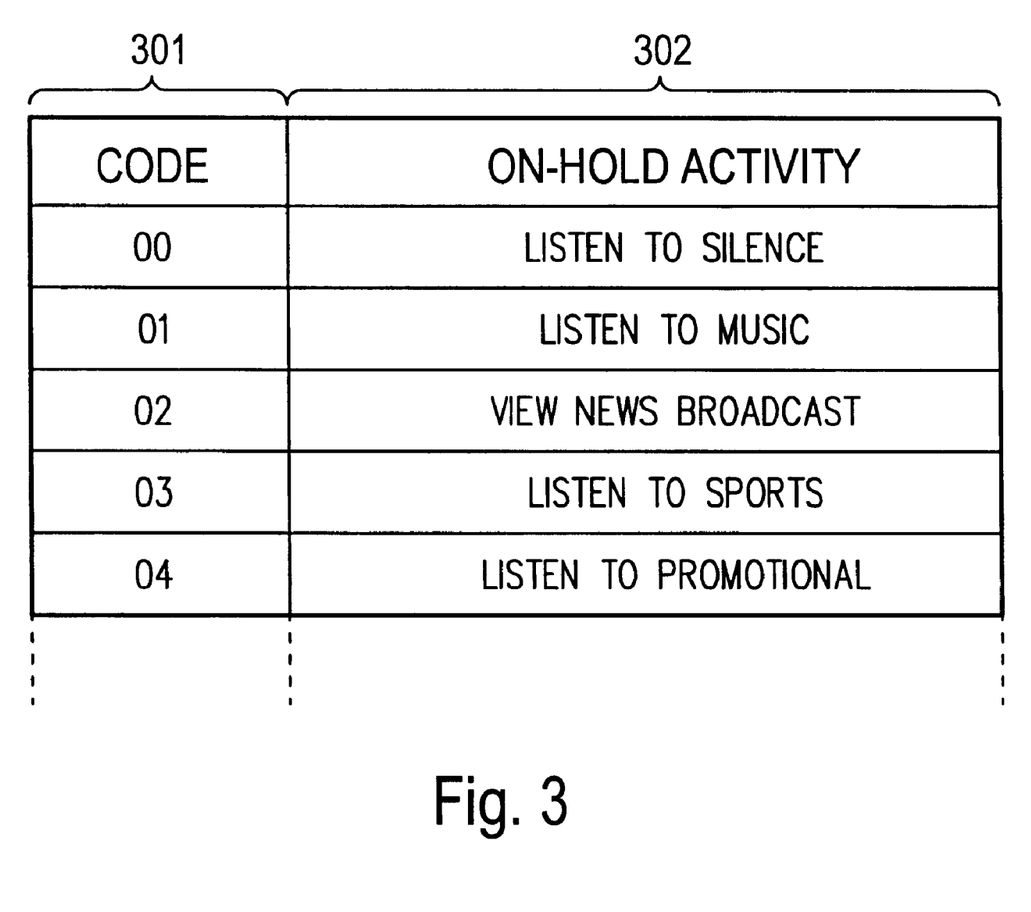
FIG. 3 is an exemplary data structure of the on-hold activity selection device.

FIG. 3 shows an example data structure 300 that may be used with the memory 202 of the present invention. The data structure 300 includes field 301 identifying on-hold activity codes and field 302 identifying the corresponding on-hold activity. The data structure 300 shows exemplary codes that may be entered by the holding party through the terminal 104. Each code is associated with an on-hold activity. When a calling party is placed on hold, the on-hold message controller 200 causes a menu message to be sent to the calling party identifying the available on-hold activities and corresponding on-hold activity codes from fields 301 and 302 of the data structure 300.

By way of example, the menu message announces to the holding party that code 00 is associated with silence, code 01 is associated with listening to music, code 02 is associated with viewing news broadcasts, code 03 is associated with listening to sports radio, and code 04 is associated with listening to promotional information. Thus, if the holding party elects not to engage in on-hold activities, the holding party may enter 00 through terminal 104. If the holding party wishes to listen to music, the holding party may enter code 01 so that music is provided through the music activity provider 210. If the holding party enters code 02, a news broadcast is transmitted to the on-hold party's terminal 104 via the news/sports service activity provider 206. If code 03 is entered, an audio sports radio broadcast is transmitted to the holding party's terminal through the news/sports service activity provider 206. If code 04 is entered, an advertisement is provided to the holding party's terminal through the promotional information activity provider 208.

The data structure 300 described herein provides only a single level of available on-hold activities, however, the data structure may include multiple levels of on-hold activities with each additional level being accessed through an upper level. For example, when the on-hold party inputs code 01 for music, using their terminal 104, the on-hold activity selection device 114 may send a second menu message to the on-hold party's terminal 104 prompting the on-hold party to select from, for example, pop music, classical music, rock music, jazz music and the like. For example, the on-hold activity selection device 114 may send another menu message to the on-hold party's terminal 104 requesting that the on-hold party "input 11 for classical music, 12 for contemporary rock music and 13 for jazz." Thus, multiple levels of message topics may be used with the present invention.

The selection of on-hold activities may be performed by any means available to the terminals 102 or 104. For example, the on-hold activity code may be entered via a user interface incorporated into the terminal. The interface may include, for example, a keyboard, keypad, pointing device, touch screen, speech recognition, and the like.

The various providers 206, 208, 210 provide on-hold activities to the on-hold party's terminal 104 through, for example, interface 204. The providers 206, 208, 210 may provide direct feeds from, for example, satellite communications, radio broadcasts, television broadcasts, and the like. Additionally, providers 206, 208 and 210 may include storage devices, such as magnetic tape, digital storage devices, compact disks, DVD, audio tape, and the like, to store prerecorded on-hold activities or computer programs to be provided to on-hold parties.

The on-hold activities are not limited to those described or shown in FIG. 3. Any on-hold activity readily apparent to one of ordinary skill in the art may be used with the present invention. For example, some on-hold activities may include listening to classical music, rock music, pop music, listening to or viewing religious broadcasts, college sports, talk radio, television broadcasts and the like.

While the terminal 104 is engaged in the selected one of the on-hold activities mentioned above, the controller 200 continues to monitor the on-hold condition through interface 204. When the on-hold condition is removed by, for example, terminal 102, the communication connection to the on-hold activity selection device 114 is temporarily placed on hold or terminated, and a communication connection to terminal 102 is re-established. If the connection to on-hold activity selection device 114 is temporarily placed on hold, information pertaining to the on-hold party's terminal 104 and the on-hold activity's status is stored in memory 202, for example.

If the terminal 102 places the communication on-hold again, the controller 200 continues the on-hold activity from the previous stopping point, stored in memory 202, or permits the on-hold party to select another on-hold activity using the menu message. This sequence may be continued until the communication between the terminals 102 and 104 is completed.

After the communication between the terminals 102 and 104 is completed, if the provider of the on-hold message selection device 114 so chooses, the terminal 104 may continue the selected on-hold activity that was started during the on-hold condition between the terminals 102 and 104. Thus, if the calling party wishes to continue listening to, viewing, or playing a selected on-hold activity, he/she may be reconnected to the on-hold activity selection device 114 to complete listening to/viewing/playing the on-hold activity. The on-hold activity selection device 114 may send a message to the terminal 104 asking if the calling party wishes to continue the on-hold activity. The choice to continue the on-hold activity after completion of the communication may be indicated to the on-hold activity selection device 114 through a signal from terminal 104. The on-hold activity may be continued until a stop condition is achieve, such as for example, a predetermined time has elapsed or the end of the on-hold activity is arrived at.

Figure 4:
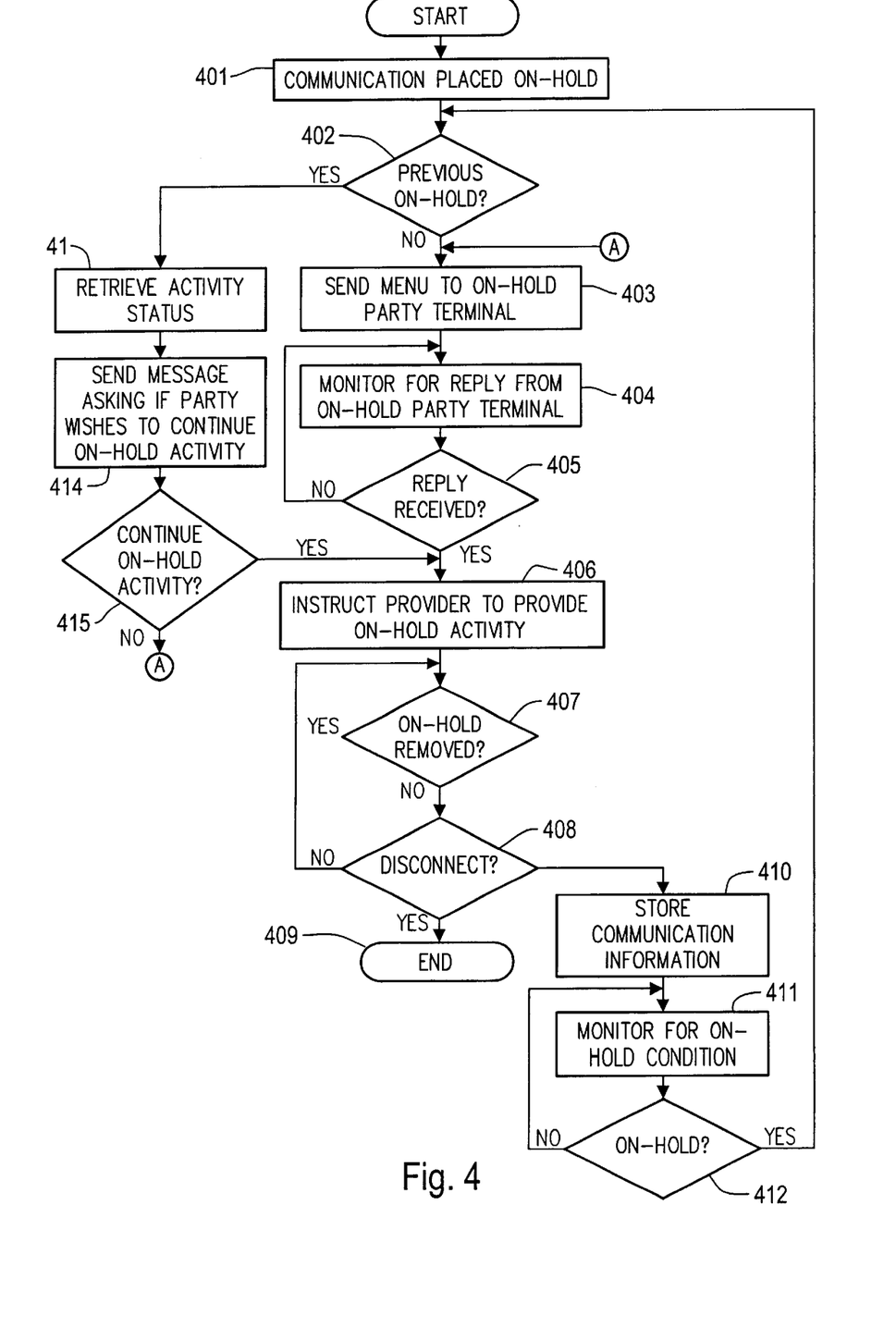
FIG. 4 is a flowchart outlining an exemplary process of the on-hold activity selection device.

FIG. 4 is a flowchart outlining one exemplary process for the on-hold activity selection device 114. The flowchart of FIG. 4 assumes only a single level of available on-hold activity choices. However, as described above, the menu provided to the on-hold party's terminal may include a plurality of levels of on-hold activity choices.

In step 401, the on-hold activity selection device 114 determines that a communication from a terminal 104, for example, has been placed in an on-hold condition, and goes to step 402. In step 402, the on-hold activity selection device 114 determines if the communication has been previously placed on-hold. If the communication was previously placed on hold, control goes to step 413; otherwise, control continues to step 403.

In step 403, the on-hold activity selection device 114 prompts the terminal 104 by sending a menu message to the terminal 104 requesting that the calling party, now the on-hold party, select an on-hold activity from a list of available on-hold activities. Control continues to step 404 where the on-hold activity selection device 114 monitors for a reply. from the calling party's terminal 104.

In step 405, the on-hold activity selection device 114 determines if a reply has been received. If a reply is received, control continues to step 406; otherwise, control returns to step 404 and continues to monitor for a reply. Alternatively, control may return to step 403 and send the menu message to the calling party's terminal 104 again.

Again, this flowchart assumes only a single level of available on-hold activities from which to choose. However, if a plurality of levels of on-hold activity choices is provided, steps 403–405 may be repeated until the bottom level of the on-hold activity choices is reached.

In step 406, the on-hold activity selection device 114 instructs one of a plurality of providers to provide the selected on-hold activity to the terminal 104, for example. By way of example, if the subscriber inputs code 02, the on-hold activity selection device 114 instructs the news/sports provider 206 to transmit news broadcasts to the terminal 104. The providing of an on-hold activity may also be determined based on on-hold activity status information retrieved in step 413. Control then continues to step 407.

In step 407, the on-hold activity selection device 114 determines if the on-hold condition has been removed. If the on-hold condition has not been removed, control goes to step 408; otherwise, control continues goes to step 410. In step 408, the on-hold activity selection device 114 determines whether the call between the terminal 104 and the called terminal 102 has been disconnected. If disconnected, the on-hold activity selection device 114 goes to step 409 and ends; otherwise, the on-hold activity selection device 114 returns to step 407.

In step 410, the on-hold activity selection device 114 stores communication information, such as the calling party's name, the calling terminal's identification, the called party's identification, and the like, and the status of the on-hold activity, and goes to step 411.

In step 411, the on-hold activity selection device 114 places the connection to the on-hold activity selection device 114 on-hold and monitors for an on-hold condition. In step 412, the on-hold activity selection device 114 determines if an on-hold condition has occurred. If an on-hold condition has occurred, the on-hold activity selection device 114 goes returns to step 402; otherwise, the on-hold activity selection device 114 returns to step 411 and continues to monitor for an on-hold condition.

If, in step 402, the communication has been previously placed on-hold, the on-hold activity selection device 114 goes to step 413. In step 413, the on-hold activity selection device 114 retrieves the activity status information from the communication information stored in memory and goes to step 414. In step 414, the on-hold activity selection device 114 sends a resume message to the on-hold party terminal asking if the on-hold party wishes to continue the on-hold activity.

In step 415, the on-hold activity selection device 114 determines if the on-hold party wishes to resume the on-hold activity. If so, the on-hold activity selection device 114 goes to step 406; otherwise, the on-hold activity selection device 114 goes to step 403.

As a practical example of the implementation of the present invention, consider a telephone communication between a calling party, Steve, and a called party, Candace. When Steve calls Candace, Candace places the communication from Steve on hold. In response, the on-hold activity selection device 114 sends a menu message to Steve requesting "Please choose from the following on-hold messages: Press (1) to listen to music. Press (2) to listen to news. Press (3) to listen to a message from Candace's Apparel." In response, Steve presses "6" on his telephone keypad.

The on-hold activity selection device 114 receives Steve's reply message and sends a second menu message requesting "Please choose from the following options: Press (5) for classical music. Press (6) for pop music. Press (7) for rock music. Press (8) for jazz music." Steve presses "6" on his telephone keypad.

The on-hold activity selection device 114 receives Steve's reply and begins sending transmissions associated with Steve's selection. For this example, the on-hold activity selection device 114 begins sending either prerecorded or live feed radio transmissions of pop music. While sending on-hold transmissions to Steve's telephone, the on-hold activity selection device 114 continues to monitor the communication link between Steve and Candace. If Candace removes the on-hold condition, i.e. picks-up on the communication link, the sending of on-hold transmissions is temporarily halted.

Information pertaining to the current status of the on-hold activity is stored along with identification information for Steve's terminal, such as the telephone number, mobile identification number (MIN), and the like. If Candace again places Steve on hold, Steve may continue listening to pop music from the point where he left off. Likewise, once Steve has completed his communication with Candace, Steve may continue listening to pop music until the on-hold activity is completed or until a predetermined amount of time has expired.

With the present invention, on-hold parties may select on-hold activities in which to be involved. Thus, on-hold parties are less likely to abandon their call while on-hold because they are being presented with on-hold activities of interest to the on-hold party.

In another embodiment of the present invention, a profile database of user profiles that provide information pertaining to calling parties may be used to customize the listing of available on-hold activities. The profile database may be a separate device in communication with the on-hold activity selection device 114 through an appropriate interface or may be incorporated, for example in the memory 202.

The information stored in the user profiles of the profile database may include identifiers of on-hold activities of interest for the particular calling parties correlated with identifiers for the calling party's terminal. Thus, when a party is placed on-hold the controller 200 of the on-hold activity selection device 114 obtains the terminal information for the on-hold party and uses the terminal information to locate a user profile, if any. Based on the user profile, the on-hold activity selection device 114 sends a customized menu message to the on-hold party's terminal. The customized menu message provides a listing of on-hold activities of interest to the on-hold party based on those on-hold activities identified in the user profile information. The identification of the calling party's terminal may be obtained, for example, from the telephone number, MIN, and the like.

Figure 5:
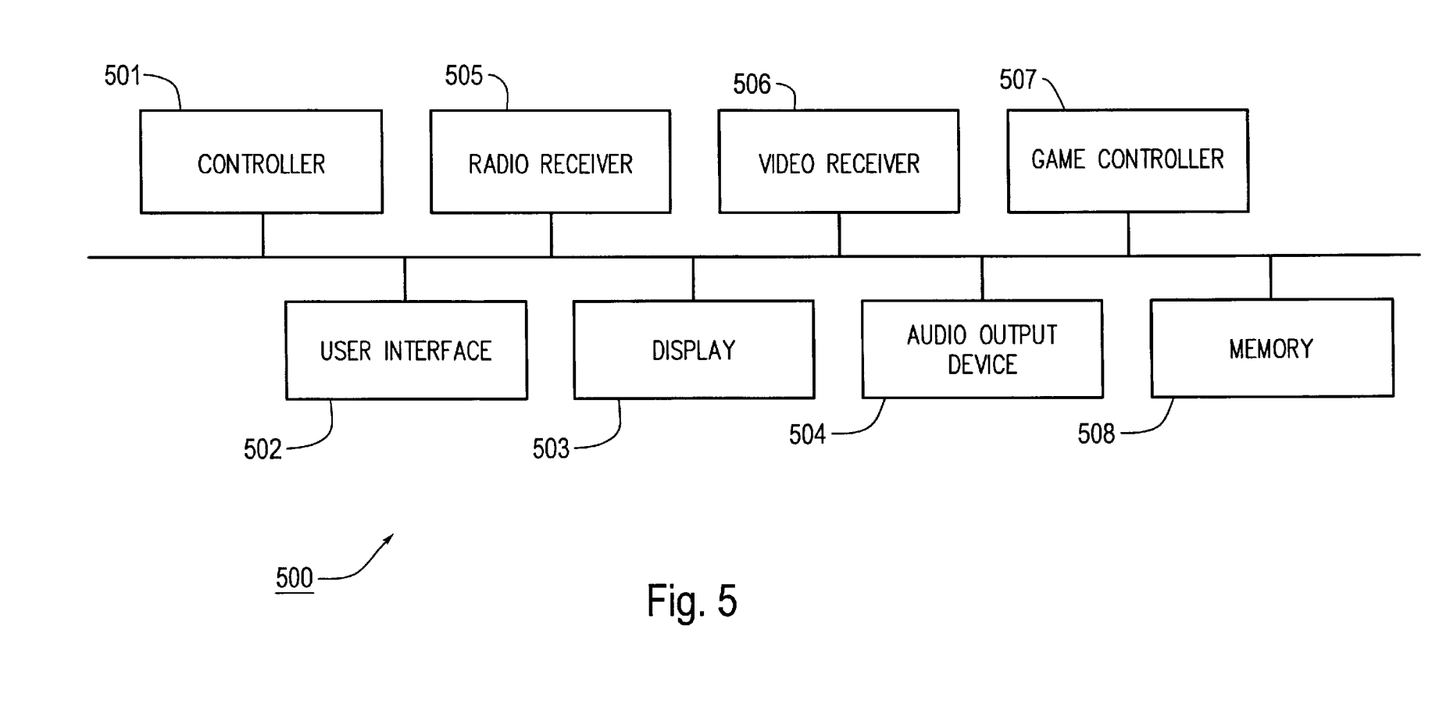
FIG. 5 is a block diagram of a terminal incorporating the on-hold activity selection. device.

FIG. 5 is a exemplary block diagram of a terminal incorporating the on-hold activity selection device 114 according to another embodiment of the present invention.

As shown in FIG. 5, the terminal 500 includes a controller 501, a user interface 502, a display 503, an audio output device 504, a radio receiver 505, a video receiver 506, a game controller 507, and a memory 508.

When either a first party using the terminal 500 shown in FIG. 5 or a second party communicating with the first party is placed on hold, the controller 501 of the terminal detects the on-hold condition and presents a menu of available on-hold activities from which the on-hold party may choose. The menu listing may be obtained from information stored in the memory 508. Included in the possible activities is the ability to listen to music, news, sports, and the like through the radio receiver 505, watch video broadcasts through the video receiver 506, and the like, similar to the embodiments described above.

In addition to the above, the terminal 500 also provides the on-hold party with the ability to play video games using the user interface 502, the display 503 and the audio output device 504. The memory 508 may store one or more video games from which the on-hold party may choose to play during the on-hold period.

When the on-hold condition is removed, the terminal 500 stores the current status of the on-hold activity in memory 508 so that the on-hold activity may be resumed at a later time. For example, if the on-hold party was listening to a particular radio station, the identification information for the radio station, or the on-hold activity, is stored in memory. If the on-hold party is involved in a video game, the current status of the video game, such as position, score, and the like, are stored in memory 508 so that the on-hold party is able to resume the game at a later time, such as when the communication is completed.

Figure 6:
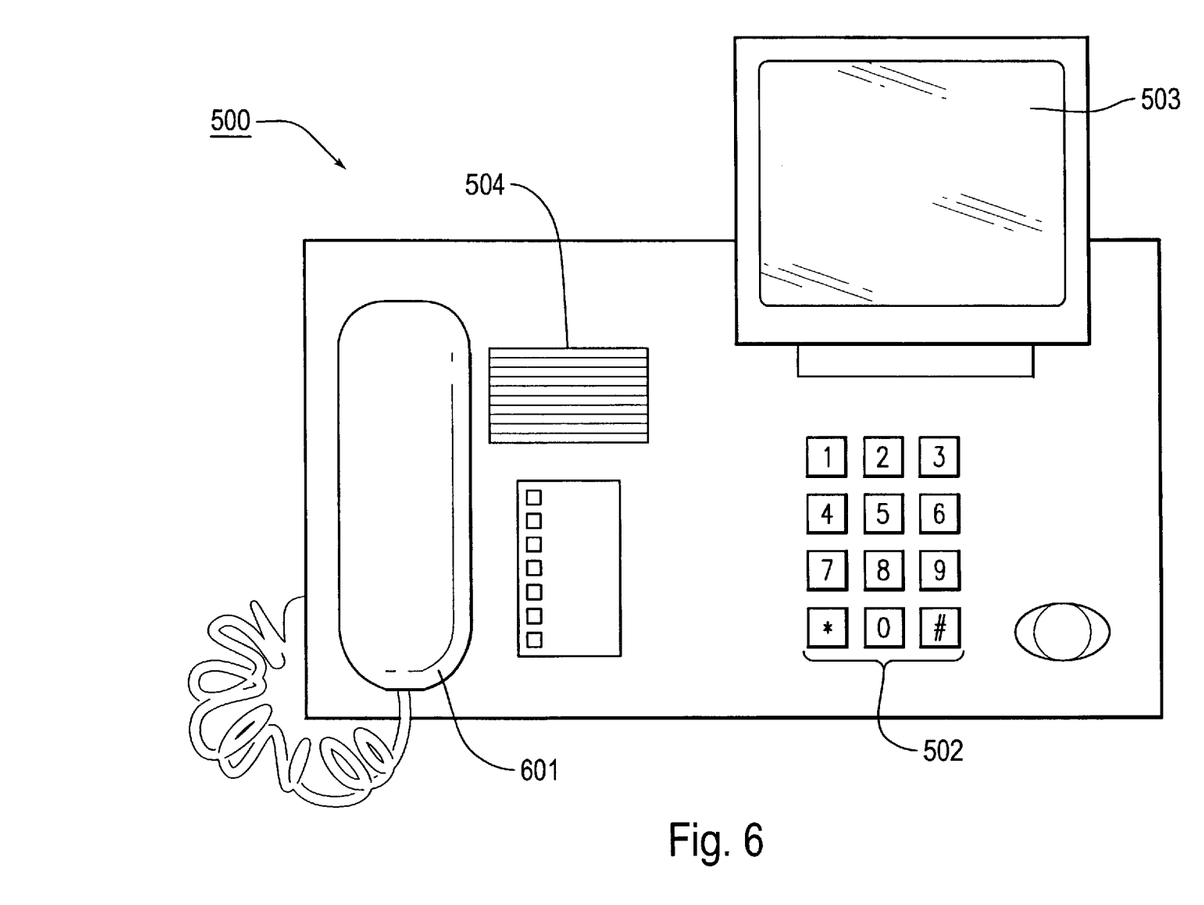
FIG. 6 is a diagram of the terminal of FIG. 5.

FIG. 6 is a example diagram of a terminal 500. As shown in FIG. 6, the terminal includes a keypad user interface 502, a display 503, a telephone handset 601, a speaker audio output device 504. The keypad 502 serves both as a telephone keypad for initiating communications and choosing on-hold activities as well as a user interface 502 for interacting with video games. The display 503 provides a means for displaying video transmissions as well as for providing graphical displays for use with video games. The speaker audio output device 504 provides audio output for speaker telephone functions as well as for audio output of video games.

Additionally, as described above, the on-hold activities include the ability to browse the Internet. This activity is available if the on-hold party's terminal includes a display, such as the display 503 of terminal 500 shown in FIG. 6. When an on-hold party selects the "browse Internet" activity, the on-hold party may be logged onto a Web site for the particular on-hold activity selection device 114 provider, and given the opportunity to browse the Web site as well as other Internet locations. The ability to browse the Internet is contingent on either the on-hold activity selection device 114 provider or the on-hold party's terminal having access to Internet browsing software.

Thus, with the terminal 500, on-hold parties may be supplied with on-hold messages similar to the previously described embodiments as well as the ability to play video games during an on-hold period and resume the play of video games at a later time and the ability to log onto and browse the Internet.

In another embodiment of the present invention, the menu message provided to the on-hold party's terminal includes an approximate on-hold time. The approximate on-hold time may be determined by the controller 200 or 501 based on historical data, a predetermined function, obtained from a look-up table, or the like. The approximate on-hold time is sent to the on-hold party's terminal with the menu message in order to provide the on-hold party with an approximation of how long he/she will be kept on hold. Knowing the approximate on-hold time, the on-hold party will be able to choose an appropriate on-hold activity that may be completed within the approximated on-hold time.

For example, if the approximate on-hold time is determined to be three minutes, the on-hold party may choose to listen to music. Alternatively, if the approximate on-hold time is ten minutes, the on-hold party may choose to play a video game or some other activity that requires more time to complete.

Additionally, the listing of on-hold activities provided to the on-hold party's terminal in the menu message, may be customized based on the approximate on-hold time. Thus, if the on-hold time is only three minutes, the controller 200 or 501 sends a menu message listing only those on-hold activities that are suited for an on-hold time of approximately three minutes, such as listening to music, advertisements, news, sports, and the like. The listing may also be further customized based on user profile information in a profile database, as described above.

As shown in FIGS. 2 and 5, the method of this invention is preferably implemented on a programmed processor. However, the on-hold activity selection device 114 can also be implemented on a general purpose or special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which a finite state machine capable of implementing the flowchart shown in FIG. 4 can be used to implement the on-hold activity selection device 114 functions of this invention.

While this invention has been described with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the invention.

What is claimed is:

1. A method of providing on-hold activities, comprising:

providing at least one selected on-hold activity to an on-hold party terminal;

storing current status of the at least one selected on-hold activity; and returning the party to the at least one selected on-hold activity based on the current status if the at least one selected on-hold activity was interrupted.

2. The method of claim 1, further comprising:

switching from the at least one selected on-hold activity to another at lean one on-hold activity based on a command.

3. The apparatus for providing on-hold activities, comprising:

an interface;

a controller, the controller providing at least one selected on-hold activity to an on-hold party terminal, wherein the controller stores current status of the at least one selected on-hold activity, and returns the party to the at least one selected on-hold activity based on the current status if the at least one selected on-hold activity was interrupted.

4. The apparatus of claim 3, wherein the controller switches from the at least one selected on-hold activity to another at least one on-hold activity based on a command.

* * * * *